United States Patent [19]
Simokat et al.

[11] 3,941,941
[45] Mar. 2, 1976

[54] RELAYLESS SWITCHING CIRCUIT FOR APPLICATION OF RINGING SIGNALS

[75] Inventors: Frank L. Simokat, Euless; Lucian W. Spencer, Arlington, both of Tex.

[73] Assignee: Superior Continental Corporation, Hickory, N.C.

[22] Filed: Sept. 27, 1973

[21] Appl. No.: 401,418

[52] U.S. Cl. .............................................. 179/84 R
[51] Int. Cl. ........................................... H04m 1/26
[58] Field of Search ..... 179/89 R, 89 T, 158, 158 A

[56] References Cited
UNITED STATES PATENTS

| | | | |
|---|---|---|---|
| 3,145,266 | 8/1964 | Owen | 179/84 R |
| 3,291,916 | 12/1966 | Jorgensen | 179/84 R |
| 3,603,740 | 9/1971 | Cambridge | 179/84 R |
| 3,688,038 | 8/1972 | Hugyecz et al. | 179/84 R |

Primary Examiner—Kathleen H. Claffy
Assistant Examiner—Gerald L. Brigance
Attorney, Agent, or Firm—Strauch, Nolan, Neale, Nies & Kurz

[57] ABSTRACT

A relayless switching circuit which provides an effectively open circuit between a telephone and a ringing generator when the ringing generator is de-energized and which is conditioned when the ringing generator is turned on to couple pulses of ringing voltage to the telephone and to effectively open the talking circuit during the occurrences of the ringing voltage pulses.

15 Claims, 2 Drawing Figures

RELAYLESS SWITCHING CIRCUIT FOR APPLICATION OF RINGING SIGNALS

FIELD OF THE INVENTION

This invention relates to circuits for applying ringing voltage to a ringer or other signalling device in a telephone.

BACKGROUND

In telephone circuits which have a telephone coupled by an interface transformer to transmission equipment, it has been a practice prior to this invention to employ a relay switching circuit which normally connects the telephone to its associated winding of the transformer and which maintains the telephone normally disconnected from a ringing generator in absence of a ring control signal. Upon the occurrence of the ring control signal, a relay in the relay switching circuit is effective to disconnect the telephone from its associated transformer winding and to connect the telephone to the ringing generator so that the a.c. ringing voltage, which is produced by the generator, can energize the ringer in the telephone.

The purpose of disconnecting the telephone from the generator when the telephone is connected to its associated transformer winding is to prevent current flowing in the talking circuit from being shunted or diverted through the generator which is usually of low impedance. A purpose of disconnecting the telephone from its associated transformer winding when the telephone is connected to the ringing generator is to prevent ringing current, which is fed to operate the ringer, from being diverted through the transformer winding.

Though these relay switching circuits operate generally satisfactorily, it was recognized as an incident to this invention that cost and space savings could be realized over the foregoing type of relay switching circuit.

SUMMARY AND OBJECTS OF INVENTION

A primary object of this invention is to provide a novel relayless switching circuit which is effective to apply ringing voltage to a telephone and which is less costly and requires less space as compared with the previously described relay switching circuit.

Another object of this invention is to provide a novel relayless switching circuit which is effective to apply ringing voltage to a telephone, which prevents current coming from a ringing voltage source from being shunted through the interface transformer winding, and which is effective to effectively disconnect the telephone from the ringing voltage source in absence of a pre-selected signal.

Still another object of this invention is to provide a novel relayless switching circuit which is effective to apply ringing voltage to a telephone and which is normally more reliable as compared with the previously described relay switching circuit.

These and other objects of this invention are achieved in the illustrated embodiment in which the relayless switching circuit is connected between a ringing generator and the telephone and includes two semiconductor diode devices. One of the diode devices, which may be a Zener diode, is connected in series with the ringing generator in a first circuit branch, and the other diode device is connected in series with the interface transformer winding in a second circuit branch. These first and second circuit branches are in parallel across the operating terminals of the telephone instrument, and the two diode devices are biased in such a manner that only one of the two diode devices will conduct at a given time.

Further objects of this invention will appear as the description proceeds in connection with the below-described drawings and the appended claims.

DETAILED DESCRIPTION

Figure 1:
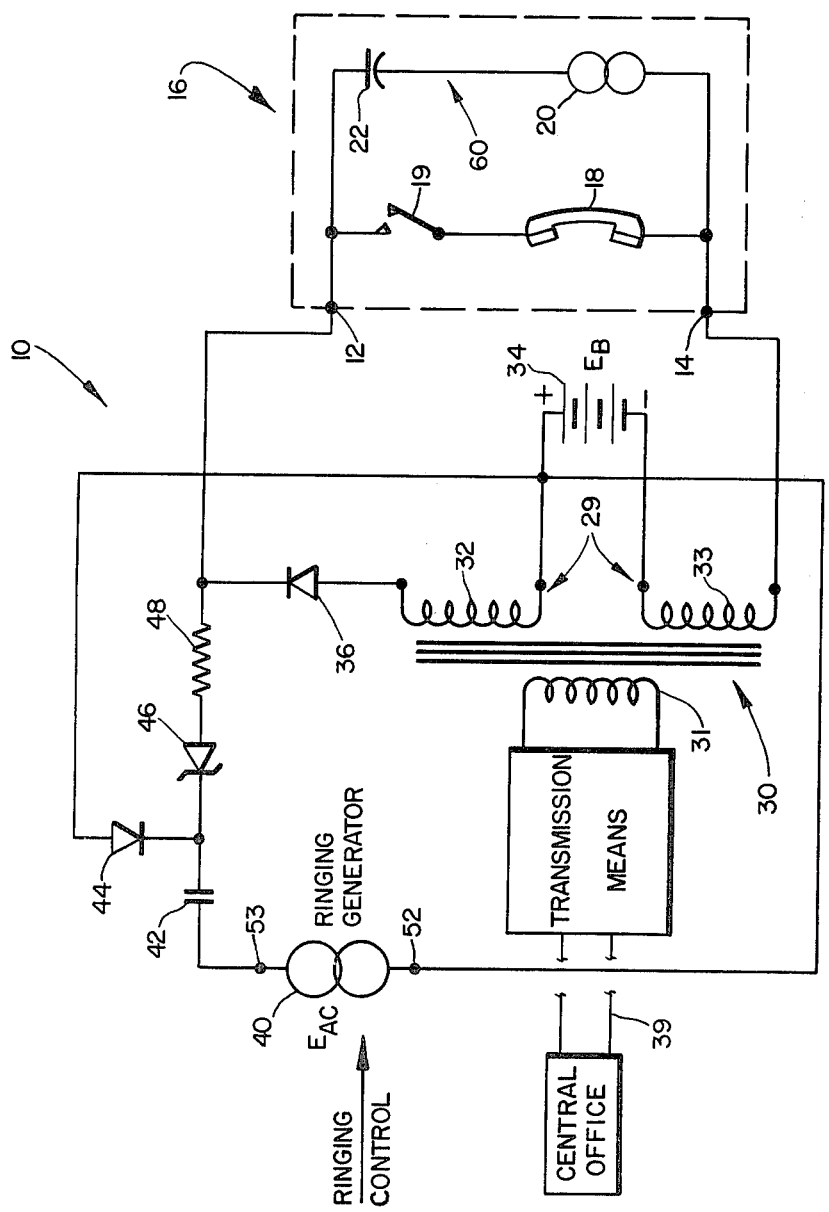
FIG. 1 is a schematic circuit diagram which illustrates a preferred embodiment of this invention.

Referring to FIG. 1 of the drawings, the relayless switching circuit which incorporates the principles of this invention is generally indicated at 10 and has a pair of output terminals 12 and 14. A telephone 16, which is of any suitable conventional construction, is connected to circuit 10 and typically includes a handset 18, a hookswitch 19 and a suitable signalling device such as a ringer 20.

In this example, ringer 20 is connected in series with a capacitor 22 across terminals 12 and 14. Handset 18 is connected in series with hookswitch 19 across output terminals 12 and 14. The two circuit branches respectively containing handset 18 and ringer 20 or other signalling devices are in parallel as shown.

Telephone 16 is also connected through terminals 12 and 14 to one side of a suitable interface transformer 30 which is effective to couple voice frequency signals in both directions. Transformer 30 has a pair of magnetically coupled windings 29 and 31. Winding 29 is of the split type and has a pair of winding portions 32 and 33.

As shown in FIG. 1, one terminal of winding portion 32 is connected to the positive side of a battery 34, and the other terminal of winding portion 32 is connected to the anode terminal of a semiconductor diode 36 which forms a part of circuit 10. The cathode terminal of diode 36 is connected to terminal 12. One terminal of winding portion 33 is connected to the negative side of battery 34, and the other terminal of winding portion 33 is connected directly to terminal 14. When diode 36 is forward biased, winding 29 will be electrically connected to telephone 16.

Winding 31 may be connected to conventional transmission means or equipment which, in turn, is connected by a two-conductor telephone transmission line 39 to a central office. By way of example, the transmission means may be a repeater. Alternatively, the transmission means may be a subscriber carrier apparatus such as that shown in U.S. Pat. No. 3,501,591 which issued on Mar. 17, 1970 to Lester Q. Krasin and Clifford E. Greene. If subscriber carrier apparatus is connected to transformer 30, it will be appreciated that transformer 30 will customarily be of the hybrid type.

Battery 34 which is connected between and in series with winding portions 32 and 33 supplies the power for operating telephone 16. More particularly, battery 34 supplies the talking or microphone current for telephone 16 as well as signalling power.

Figure 2:
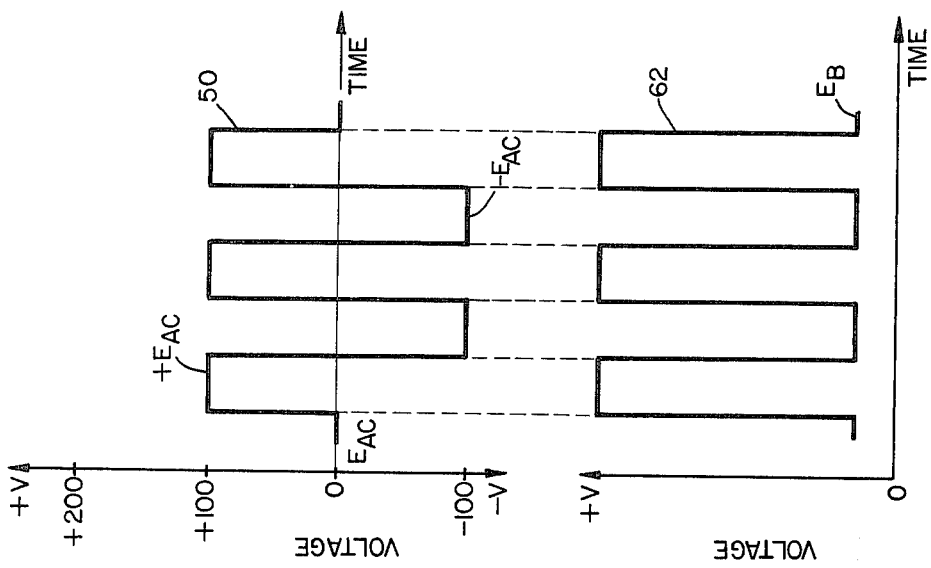
FIG. 2 is a synchrogram (waveform chart) which illustrates the ringing generator voltage and the ringing voltage which is applied to the telephone by the circuit of this invention.

Circuit 10, which is connected between a conventional ringing generator 40 and telephone 16, further comprises a capacitor 42, a semiconductor diode 44, a Zener diode 46 and a limiting resistor 48. Generator 40 provide an a.c. ringing voltage. The voltage supplied by generator 40 may be a constant frequency square wave as indicated at 50 in FIG. 2. Alternatively, generator 40 may produce a sine wave. The frequency and RMS value of the a.c. ringing voltage may be any suitable pre-selected values. The waveform voltage values indicated in FIG. 2 are only examples to assist in the understanding of this specific embodiment and are not intended to limit the scope of this invention.

The output terminals of generator 40 are respectively indicated at 52 and 53 and are respectively connected to the positive side of battery 34 and one plate of capacitor 42. The cathode and anode terminals of diode 46 are respectively connected to the other plate of capacitor and to one terminal of resistor 48. The other terminal of resistor 48 is connected to terminal 12 and to the cathode of diode 36. Resistor 48, Zener diode 46, capacitor 42, generator 40, battery 34, and winding portion 33 are connected in series across terminals 12 and 14.

Diode 44 is connected in parallel with the circuit branch containing generator 40 and capacitor 42. The anode of diode 44 is connected to the junction between battery 34 and generator 40 and hence to the positive side of battery 34 and to terminal 52. The cathode of diode 44 is connected to the junction between capacitor 42 and Zener diode 46. Thus, the cathode of diode 44 is connected to the cathode of diode 46 on the side of capacitor 42 opposite from generator 40.

The talking circuit for telephone 16 includes transformer 30 and the two conductors that connect winding 29 through terminals 12 and 14 to the telephone. Diode 36 is also in the talking circuit as shown.

Generator 40, which is locally powered, is normally turned off or de-activated prior to the application of a ring control signal. The ring control signal is conventionally developed upon dialing the number of telephone 16. The ring control signal may be supplied in a conventional manner from an unshown conventional ring control circuit or means which may be in the previously mentioned subscriber carrier apparatus.

For an incoming call, the ring control signal, upon dialing the number of telephone 16, is developed and applied to generator 40 to activate or turn the generator on. Generator 40, upon being turned on, produces an a.c. ringing voltage ($E_{ac}$) such as the voltage which is indicated at 50 in FIG. 2. The output of generator 40 therefore varies between maximum positive and negative values $+E_{ac}$ and $-E_{ac}$. The voltage waveform 50 is the voltage across terminals 52 and 53.

During the negative half cycle of the generator-produced voltage $E_{ac}$ diode 44 will be forward biased so that capacitor 42 will be charged by generator 40 to the generator $-E_{ac}$ voltage value. When diode 44 conducts it will be appreciated that it effectively completes a short across the circuit branch consisting of generator 40 and capacitor 42. Thus, capacitor 42 will charge up rapidly because of the short charging time constant which is nearly equal to zero.

When diode 44 conducts during the negative half-cycle of voltage $E_{ac}$ it will be appreciated that it clamps the positive side of capacitor 42 to the positive voltage ($+E_B$) of battery 34. This is as far negative as the applied voltage excursion can go. During the negative half-cycle of the generator-produced voltage, diode 44 conducts only long enough to charge capacitor 42 to the previously mentioned value.

During the positive half-cycle of the generator-produced voltage capacitor 42 will discharge through resistor 48. Capacitor 42 is relatively large with the result that the discharging time constant is long. As a result, capacitor 42 relinquishes only a relatively small amount of its charge during the positive half-cycle of the generator-produced voltage.

Thus, after one or more periods of the generator-produced voltage, the time for charging capacitor 42 back to its original value will stabilize. This charging time is normally shorter than the duration of each negative half-cycle of the generator-produced voltage.

From the foregoing it will be appreciated that the voltage across generator 40 and capacitor 42 varies between zero volts and two times the peak voltage ($+E_{ac}$) of the generator-produced voltage because capacitor 42 provides, in effect, a voltage doubler action.

While capacitor 42 is being charged during the negative half-cycle of the generator-produced voltage and for the duration of the negative half-cycle of the generator-produced voltage, Zener diode 46 will not be biased far enough forward to be conductive. However, in the positive half-cycle of the generator-produced voltage, when the polarity across generator 40 is switched, diode 44 will be reverse biased and the charge on capacitor 42 will be added to the generator-produced voltage ($+E_{ac}$) to produce the doubler effect. As a result, the voltage applied across Zener diode 46 during the positive half-cycle will exceed the Zener potential to cause diode 46 to conduct. The Zener potential is pre-selected at a suitable value which is greater than the voltage of battery 34, but significantly smaller than the peak-to-peak variation of the generator-produced voltage. For example, for a 6 volt battery and a 200 volt peak-to-peak variation of the generator-produced voltage, the Zener potential may be 20 volts.

Upon reaching the Zener potential when the generator-produced voltage switches to its positive half-cycle, diode 46 will conduct to couple a ringing voltage pulse (see FIG. 2) through the circuit for application across terminals 12 and 14 and, consequently, across the telephone circuit branch 60 which contains capacitor 22 and ringer 20. This ring voltage pulse will be positive and is superimposed on the positive voltage bias ($E_B$) which is furnished by battery 34.

When Zener diode 46 conducts, the voltage applied to the cathode of diode 36 will become more positive than the positive battery voltage which is applied to the anode of diode 36. As a result, diode 36 will be reverse biased and non-conducting while Zener diode 46 is conducting. Diode 36 is therefore reverse biased for the duration of the positive half cycle of the generator-produced voltage.

Thus, for the duration of the positive half cycle of the generator-produced voltage, diode 36 effectively opens the talking circuit that connected winding 29 across terminals 12 and 14. Consequently, none of the ringing current which is fed through Zener diode 46 to charge capacitor 22 will be diverted or shunted through the two winding portions 32 and 33.

Instead, the charging circuit for charging capacitor 22 and the discharging circuit for capacitor 42 is from capacitor 42, generator 40 and battery 34 (which are all connected in series), through winding portion 33, through branch 60, through resistor 48 and finally through Zener diode 46 to the composite emf source which consists of capacitor 42, generator 40 and battery 34.

It will be observed that for the duration of the positive half cycle of the generator-produced voltage, the talking circuit is effectively disconnected from telephone 16 and only one circuit branch in circuit 10 is connected across terminals 12 and 14. In this single circuit branch, capacitor 42, generator 40, battery 34, winding portion 33, resistor 48, and Zener diode 46 are all connected in series across terminals 12 and 14. Thus, neglecting the voltage drops across diode 46 and resistor 48, the ringing voltage which is coupled through by circuit 10 and which is applied across circuit branch 60 at the start of the positive half cycle of the generator-produced voltage will be the sum of twice the positive generator-produced voltage plus the battery voltage and less the zener potential of diode 46.

Since diode 36 effectively provides an open circuit for the duration of the positive half cycle of the generator-produced voltage it is clear that the objectionable application of ringing voltage across both portions of winding 29 is avoided.

On the next negative half cycle of the generator-produced voltage, Zener diode 46 again becomes non-conductive to effectively present an open circuit that disconnects generator 40 and capacitor 42 from telephone 16. In addition, diode 44 will again conduct to complete the charging circuit for re-charging capacitor 42 which partially discharged during the positive half cycle of the generator-produced voltage.

During the negative half cycles of the generator-produced voltage, diode 36 is biased by battery 34 so that, neglecting the resistance in winding portion 32, it will conduct if the voltage at the anode of diode 36 starts to go negative with respect to the positive battery voltage. As a result, diode 36 is conditioned to conduct to maintain a positive d.c. bias ($E_B$) across terminals 12 and 14. The positive pulses coupled through Zener diode 46 will be superimposed on this positive bias. Thus, for recurrent cycles of the generator-produced voltage, a pulsating d.c. current, which is always positive, will be fed with a superimposed bias to capacitor 22. Capacitor 22 will therefore charge and discharge in a well known manner to cause an alternating current to flow through ringer 20 to ring the ringer.

From the foregoing description it will be appreciated that when generator 40 is turned on, circuit 10 is rendered effective by the generator-produced voltage to couple positive pulses, as indicated at 62 in FIG. 2, to circuit branch 60. The maximum and minimum valves of the waveform 62 will be of the same polarity and are positive for this embodiment. If the generator-produced voltage is a square wave, the waveform 62 will also be a square wave.

It also is clear that during the negative half cycles of the generator-produced voltage, Zener diode 46 is not conducting with the result that it effectively disconnects generator 40 and capacitor 42 from terminals 12 and 14. During the positive half-cycles, when Zener diode 46 is conducting, diode 36 will be reverse biased and hence nonconducting. It will be appreciated that the bias conditions are such that diodes 36 and 46 will not conduct at same time.

When the call is answered by transferring the telephone to its off-hook condition, hookswitch 19 closes. As a result a change in loop current in the talking circuit occurs. Ring trip voltage may be taken from any suitable location in the talking circuit such as from the negative leg of battery 34. When hookswitch 19 is closed, a change in the ring trip voltage occurs, as is well known, and a conventional unshown ring trip circuit is responsive to this voltage change to turn off generator 40.

When generator 40 turns off Zener diode 46 will no longer conduct and therefore effectively opens the circuit that connected generator 40 and capacitor 42 to terminals 12 and 14. Generator 40 and capacitor 42 are therefore effectively disconnected from the talking circuit and from terminals 12 and 14. Therefore, alternating current in the talking circuit will not be shunted or diverted through generator 40 which has a low impedance.

Furthermore, the single polarity of the ringing voltage, which is applied across terminals 12 and 14 and which is indicated at 62, assures that the ring trip current will also be at the proper polarity (on the positive side in this instance) regardless of whether the generator-produced voltage 50 is in its positive half cycle or its negative half cycle when hookswitch 19 is closed.

The presence of diode 36 in the talking circuit does not present any problem in the transmittal of signals or voice frequency information bcause the alternating current in the talking circuit is not large enough to reverse bias diode 36. Therefore, when diode 36 is biased into conduction upon transferring the telephone to its off-hook condition, it will remain conductive and hence will not cause any rectification.

From the foregoing description it is evident that circuit 10 achieves all of the desired switching functions without any relays. In addition to not containing any relays, circuit 10 also does not contain any tubes, transistors, or semiconductor devices with three or more terminals. As compared with prior relay switching circuits, circuit 10 is less costly, requires less space and is uniquely simple.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination with a telephone, a talking circuit normally connected to said telephone, a telephone transmission line providing a signal-transmitting connection between said talking circuit and a central office, and a ringing generator located at the talking circuit end of said transmission line remote from said central office for developing an a.c. voltage in response to the occurrence of a pre-selected signal which is transmitted from said central office to signal an incoming call to said telephone, a static switching circuit rendered effective by said a.c. voltage (a) to convert said a.c. voltage into a pulsating d.c. ringing voltage and to apply said pulsating ringing voltage to said telephone to operate a signaling device in said telephone and (b) to effectively electrically disconnect a portion of said talking circuit from said telephone during application of the pulses of said ringing voltage to said telephone.

2. In combination with a telephone, a signal transmitting circuit having an interface transformer, a winding forming a part of said transformer, and a ringing generator which is responsive to a pre-selected signal to produce an a.c. voltage, a switching circuit having first and second semiconductor means, said first semiconductor means being in series with said winding in a first circuit branch, said second semiconductor means being in series with said generator in a second circuit branch, and said first and second circuit branches being connected in parallel across operating terminals of said telephone, said second semiconductor means being effective to couple d.c. ringing voltage pulses to said operating terminals only on the occurrence of half cycles of only one pre-selected polarity of said a.c. voltage, and said first semiconductor means being effective upon the occurrence of said d.c. pulses to effectively open the circuit which connects said first branch across said operating terminals.

3. The combination defined in claim 2 wherein said first and second semiconductor means respectively are a diode and a Zener diode.

4. The combination defined in claim 3 wherein a terminal of a battery is connected to said generator, wherein said switching circuit further comprises a capacitor connected in said second circuit branch in series with and between said Zener diode and said generator, and wherein a further diode has one terminal connected to a junction between said capacitor and said Zener diode and its other terminal connected to a junction between said generator and said battery to effect the charging of said capacitor only during half cycles of said a.c. voltage which are of the opposite polarity from said one pre-selected polarity.

5. A telephone transmission system comprising signal transmission means, a telephone instrument, a transformer normally coupling said telephone instrument to said transmission means and having first and second winding means, said first winding means being connected to said transmission means, a ringing generator energizable from an inactive state to an active voltage-producing state by a pre-selected ring control signal, and circuit means for connecting said generator to said telephone to couple pulses of ringing voltage to said telephone, said circuit means including a semiconductor device which is normally conductive when said generator is in said inactive state to complete a signal transmitting circuit between second winding means and said telephone, the bias of said semiconductor device being controlled by voltage conditions which are developed when said generator is in its active voltage-producing state to effectively open said signal transmitting circuit during the occurrence of said pulses.

6. The telephone transmission system defined in claim 5 wherein said transmission means comprises a carrier circuit.

7. The telephone transmission system defined in claim 5 wherein said circuit means further comprises a capacitor connected in series with said generator and a Zener diode connected in series with said capacitor and said generator, said semiconductor device being in parallel with the circuit branch containing said generator, said Zener diode and said capacitor.

8. The telephone transmission system defined in claim 7 wherein a battery is connected to said second winding means, and wherein said circuit means further includes a semiconductor diode, the positive terminal of said battery being connected through said semiconductor diode to interconnected terminals of said Zener diode and said capacitor.

9. The telephone transmission system defined in claim 8 wherein said semiconductor device is a semiconductor diode, said battery, said second winding means, and said semiconductor device being connected in series in a circuit branch which is connected across terminals of said telephone.

10. In combination with a telephone, a telephone transmission line adapted to be connected to a central office, a talking circuit normally electrically connected to said telephone to provide a signal-transmitting connection between said telephone and said transmission line, and a normally de-activated ringing generator located at the talking circuit end of said transmission line remote from said central office, said generator being turned on to develop an a.c. output voltage in response to the occurrence of a pre-selected signal which signals an incoming call to said telephone, the improvement comprising a static switching circuit connected to said generator, said talking circuit and said telephone for maintaining said generator effectively electrically disconnected from said telephone in absence of said output voltage, and said switching circuit being rendered effective by said output voltage (a) to convert said output voltage into a pulsating d.c. ringing voltage and to apply said pulsating ringing voltage to said telephone to operate the telephone's ringer and (b) to effectively electrically disconnect a portion of said talking circuit from said telephone during application of the pulses of ringing voltage to said telephone.

11. The combination defined in claim 10 wherein said switching circuit has only passive and two terminal semiconductor components.

12. The combination defined in claim 10 wherein said talking circuit comprises a transformer having first and second mutually coupled winding means electrically connected to said telephone and said transmission line respectively, and wherein said switching circuit includes a semiconductor component in series with said first winding means and reverse biased by said pulses of ringing voltage.

13. In combination with a telephone, a telephone transmission line adapted to be connected to a central office, a talking circuit normally electrically connected to said telephone to provide a signal-transmitting connection between said telephone and said transmission line, and a normally de-activated ringing generator located at the talking circuit end of said transmission line remote from said central office, said generator being turned on to develop an a.c. output voltage in response to the occurrence of a pre-selected signal which signals an incoming call to said telephone, the improvement comprising a static switching circuit connected to said generator, said talking circuit and said telephone for maintaining said generator effectively electrically disconnected from said talking circuit in absence of said output voltage, and said switching circuit being rendered effective by said output voltage to apply a pulsating d.c. ringing voltage to said telephone to operate the telephone's ringer.

14. The combination defined in claim 13 wherein said switching circuit has only passive and two terminal semiconductor components.

15. The combination defined in claim 13 wherein said generator has a pair of output terminals across which said output voltage is developed, and wherein said switching circuit comprises a capacitor, semiconductor means connected in series with said capacitor across said output terminals to complete a circuit which applies said output voltage to charge and capacitor only on output voltage alternations of one preselected polarity, a capacitor discharge circuit branch including a Zener diode, said discharge circuit branch electrically connecting said capacitor to said telephone for discharging said capacitor with a time constant that is longer than the time constant for charging said capacitor, said capacitor being electrically connected between said Zener diode and one of said output terminals so that said output voltage and the charge stored on said capacitor are applied in series for biasing said Zener diode, said Zener diode being biased to its nonconducting state when said charge and said output voltage are opposing and being reversed biased far enough to conduct when said output voltage and said charge are of a common polarity and thus additive to each other to thereby facilitate the application of the ringing voltage pulses to said telephone.

* * * * *

UNITED STATES PATENT AND TRADEMARK OFFICE
CERTIFICATE OF CORRECTION

PATENT NO. : 3,941,941
DATED : March 2, 1976
INVENTOR(S) : Frank L. Simokat et al It is certified that error appears in the above-identified patent and that said Letters Patent are hereby corrected as shown below:

IN THE SPECIFICATION

Column 3, line 3: Change "provide" to --provides--.

Column 5, line 50: Change "valves" to --values--.

Column 6, line 24: Change "bcause" to --because--.

IN THE CLAIMS

Claim 15, column 9, line 1: Change "and" to --said--.

Signed and Sealed this eleventh Day of May 1976

[SEAL]

Attest:

RUTH C. MASON
*Attesting Officer*

C. MARSHALL DANN
*Commissioner of Patents and Trademarks*